Dec. 30, 1952        A. H. SCHOOLEY        2,624,044
PRECISION RANGE FINDING APPARATUS
Filed Jan. 19, 1943
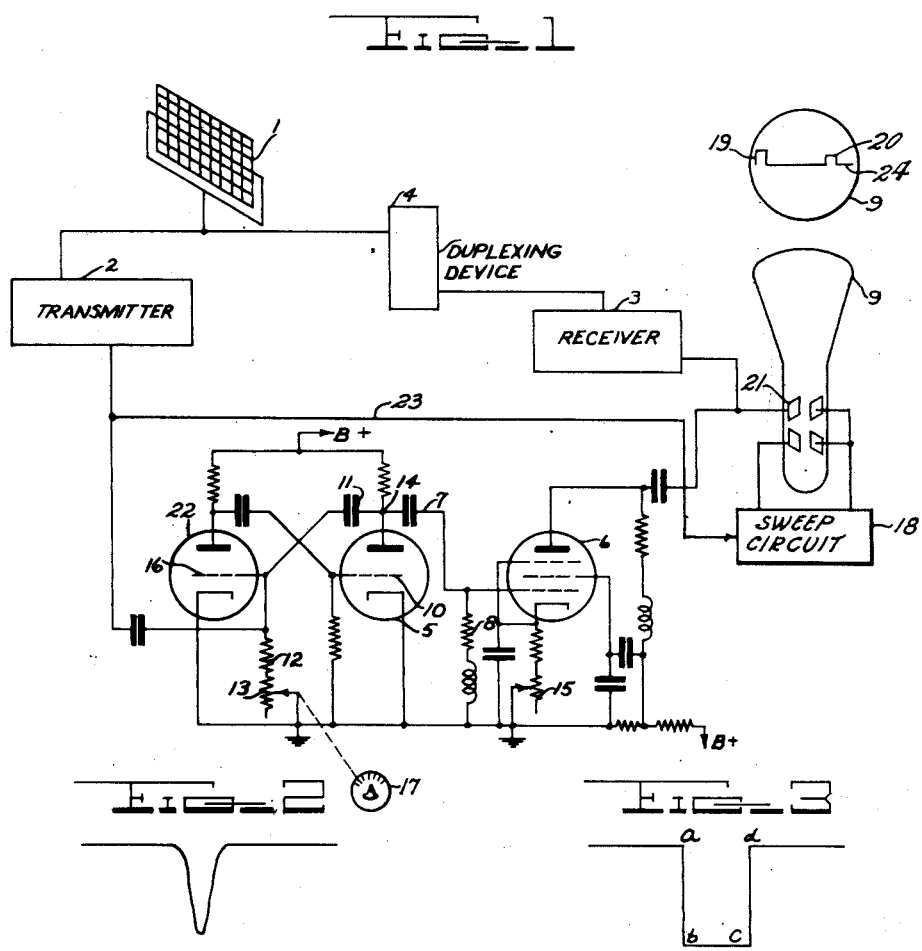
INVENTOR
ALLEN H. SCHOOLEY
By
Attorney Patented Dec. 30, 1952

2,624,044

UNITED STATES PATENT OFFICE 2,624,044

PRECISION RANGE FINDING APPARATUS

Allen H. Schooley, Washington, D. C.

Application January 19, 1943, Serial No. 472,829

6 Claims. (Cl. 343—13)

(Granted under the act of March 3, 1883, as amended April 30, 1928; 370 O. G. 757)

This invention relates broadly to a means for producing an individual series of energy pulses of adjustable width and time phase with respect to a first series of energy pulses, and more particularly to a means for making radio echo precision range finding feasible.

The majority of modern day radio echo equipment utilizes the following principle of operation. Briefly, a radio pulse transmitter is keyed and transmits into space, and usually in a unidirectional path a short radio frequency pulse. A portion of the transmitted energy is received by an adjacently located receiver and recorded, preferably at one edge on the face of a cathode ray tube, and simultaneously starts the electron beam thereof, on a diametrical trace across the face of the tube. The transmitted pulse continues out in its preselected path until it strikes an obstacle whereby some of the energy is reflected back to the receiver antenna to produce a second indication on the cathode ray tube which is displaced from the initial indication by a distance which is proportional to the range of the obstacle. Consequently with the aid of a calibrated oscilloscope an approximation of the obstacle range may be directly obtained. Precision range finding, however, has not been available with this type of system, since inevitable discrepancies exist in the graduation of the oscilloscope, and also due to the fact that comparatively small space units on the oscilloscope face are made to represent large intervals of range.

It is therefore an object of this invention to provide a means for capacitating radio detection apparatus to be used as a precision range finding instrument.

It is another object of this invention to provide a means of controlling the time duration of an energy pulse produced by a multivibrator.

It is another object of this invention to provide a means of controlling the time phase of an energy pulse produced by a multivibrator with respect to a keying pulse.

Other objects of the present invention will become apparent upon a careful consideration of the following description when taken together with the accompanying drawings, in which:

Fig. 1 is a schematic diagram partly in block and partly in detail of a preferred embodiment of the present invention;

Fig. 2 is a graphical representation of a typical pulse used in keying the multivibrator;

Fig. 3 shows, graphically, the voltage output of the multivibrator;

Fig. 4 shows, graphically, the voltage output of the differentiating circuit, and Fig. 5 is a graphical representation of the output of the clipping amplifier.

Referring to the circuit of Fig. 1, there is shown, in detail, one exemplary embodiment of the invention. In the figure, reference numeral 1 represents an antenna coupled directly to a suitable pulse transmitter 2 and through a duplexing device 4 to a suitable pulse receiver 3. As in most radio echo detection systems the output of the receiver is monitored on a cathode ray tube indicator, such as indicated at 9, which in turn is equipped with a linear time base line 24 for indicating the time relation between transmitted pulses and resulting echo signals. To this end the output of the receiver is applied, for instance, to one of the vertical deflecting plates 21 of the cathode ray tube 9, while the time base line 24 is provided by a sweep circuit 18, the action of which is synchronized with the pulsing of the transmitter 2 by means of the connection 23. The synchronization of the transmitter 2 and the sweep circuit 18 is such that each time the transmitter is pulsed its output will appear at the start of the sweep as indicated at 19, and the resulting echo signal will appear thereafter, displaced on the time base from the transmitted pulse indication according to the range of the objects producing the echo signals.

To accomplish precision ranging as taught by the invention a pedestal pulse is produced on the cathode ray tube indicator 9 as illustrated at 20. This pulse is produced synchronously with the transmitted pulse, but delayed in time therefrom. The time delay between transmitted and pedestal pulses is made controllable so that the latter may be shifted along the time base to center a selected echo signal. The time delay between the transmitted and pedestal pulses will be indicative of the range of the object producing the particular echo signal centered by the pedestal.

According to the invention the components employed to provide a controllably delayed pedestal pulse include a multivibrator circuit comprising tubes 22 and 5 connected to and synchronously keyed by the transmitter 2. The pulse output of the multivibrator, as will hereinafter be seen, is of controllable duration and is coupled through a differentiating circuit comprising capacitor 7 and resistance 8 and a pulse producing amplifier 6 to the vertical deflecting plate 21 of the cathode ray tube 9.

A better understanding of the operation of the present invention may be obtained from the following description when taken together with the appended figures, viz., as transmitter 2 is keyed so as to produce and transmit out from antenna 1 an obstable detection pulse, triode 22 of the multivibrator circuit is simultaneously keyed with an energy pulse similar to that of Fig. 2 which may be obtained from the keyer circuit of the transmitter. This pulse is applied to the grid 16 and drives triode 4 sharply to cut-off which in turn causes its anode voltage to rise abruptly in a positive direction. This sharp rise in anode voltage is applied to the grid 10 of triode 5 thereby causing this tube to draw an excessive value of plate current and consequently cause its anode voltage to drop rapidly to some value below normal and thereby charge condenser 11 negatively. The negative charge on condenser 11 leaks off through grid resistances 12 and 13 to maintain triode 22 at cut-off and conseqently triode 5 conducting for a period of time proportional to the time constant contained in this resistance capacitance network comprising resistances 12 and 13 and capacitance 11. Thus upon the depletion of the charge on condenser 11 the anode voltage of both triodes 22 and 5 returns to normal.

A more exact understanding of the voltage changes with respect to time at point 14 which, in this case, represents the output terminal of the multivibrator may be obtained from Fig. 3. The portion (a) to (b) represents the sharp drop in anode voltage which occurs simultaneously with the keying of the multivibrator. The portion (b) to (c) represents the period during which the anode of triode 5 is maintained at reduced voltage and is proportional to the time constant $C_{11}(R_{12}+R_{13})$. And the portion (c) to (d) represents the return to normal of the anode voltage which occurs upon the depletion of the negative charge of condenser 11. The output of the multivibrator is fed into the clipping amplifier 6 through a differentiating circuit comprising capacitance 7 and resistance 8. The main object of this circuit is to convert the substanially rectangular voltage output of the multivibrator into a pair of alternate spaced energy pulses as shown in Fig. 4. This object can be satisfied if the circuit constants are so selected as to allow condenser 7 to pass current only when there is a change in voltage. Thus as the anode voltage of triode 5 drops sharply with the keying of the multivibrator, a sharp negative voltage pulse is formed which is followed in time by a positive pulse when the anode voltage returns to normal. It therefore becomes obvious that the positive voltage pulse output of the differentiating circuit can be delayed in time, any desirable amount with respect to the keying pulse by adjusting the potentiometer 13 in the time constant circuit, which in turn controls the length of the portion (b) to (c) of the voltage wave shown in Fig. 3. Thus by properly choosing the constants of the circuit comprising condenser 11 and resistances 12 and 13 this pulse (positive) can be made to occur at any time between successive transmitted pulses.

The alternate spaced pulse output of the differentiating circuit is fed into the clipping amplifier 6 which is biased so as to allow only positive inputs to effect its plate current, thereby producting a negative pulse output as shown in Fig. 5, and in correspondence with the positive pulse input of Fig. 4. The output of this amplifier is connected to the deflecting means of the oscilloscope 9 and consequently produces the aforementioned pedestal pulse 20 on the screen thereof. The width of the pedestal pulse may be adjusted by means of the potentiometer 15 which controls the cathode bias on amplifier 6. Width control in the foregoing manner is made possible by the fact that the input pulse to amplifier 6 is not rectangular in shape, but more nearly triangular as illustrated in Fig. 4. Consequently, the more negative the bias on tube 6, as adjusted by potentiometer 15, the higher up on the input signal goes the cutoff bias level, and hence the narrower the output pulse of amplifier 6.

From the foregoing it becomes apparent that potentiometer 13 can be readily calibrated in suitable range units, as indicated at 17, and appropriately set to shift the pedestal pulse 20 into coincidence with any selected echo signal whose range is desired to be known. In addition to the feature of precision ranging, the present invention offers a measure of ease heretofore unattained in tracking the changing range of a moving echo. Potentiometer 15 which controls the width of the pulse gate can be set so as to include a single or a plurality of echoes whichever is the most desirable.

The present device or a very slight modification thereof, can also be employed as a means for rendering a normally blocked pulse receiver operative at the proper time and period to allow reception of the particular echo or range of echoes.

Although I have shown and described only a certain and specific embodiment of the present invention I am fully aware of the many modifications possible thereof. Therefore this invention is not to be restricted except insofar as is necessitated by the prior art and the spirit of the appended claims.

The invention described herein may be manufactured and used by or for the Government of the United States of America for governmental purposes without the payment of any royalties thereon or therefor.

I claim:

1. A precision range finding system, comprising a radio pulse transmitter, a receiver, and a visual indicator connected thereto for recording the time relation between the transmitted pulses and echo signals resulting therefrom, a pulse generator comprising a pair of vacuum tubes interconnected in such a manner as to form a multivibrator circuit, means for rendering one of said tubes non-conducting simultaneously with the keying of said pulse transmitter to thereby produce a pulse in the output of the other of said tubes, means including a differentiating circuit connected to the output of said other of said tubes in said multivibrator circuit to convert said output pulse from said other of said tubes into a pair of time spaced pulses, one of said pair of time spaced pulses being displaced from the other by an amount equal in time to the duration of the output pulse from said other of said tubes, and adjustable time constant means coupled to said multivibrator for controlling the duration of the output pulse from said other of said tubes whereby said one pulse of said time spaced pair may be shifted into time coincidence with a selected echo signal, whereby the setting of said last named means will be indicative of the range of the object producing said selected echo signal, the occurrence of coincidence between said one of said pair of pulses and said echo signal being indicated on said visual indicator.

2. A precision range finding system, comprising a radio pulse transmitter, a receiver, and a visual indicator connected thereto for recording the time relation between the transmitted pulses and echo signals resulting therefrom, a pulse generator comprising a pair of triode vacuum tubes having their anodes and grids interconnected in such a manner as to form a multivibrator circuit, means for rendering one of said tubes non-conducting simultaneously with the keying of said pulse transmitter to thereby produce a pulse in the output of the other of said tubes, means operative in response to the trailing edge of the output pulse from said other of said tubes to produce a substantially rectangular output pulse, and adjustable time constant means coupled to said multivibrator for adjusting the duration of the output pulse from said other of said tubes to thereby delay the occurrence of said rectangular pulse after the keying of said transmitter to establish time coincidence between said rectangular pulse and a selected echo signal, whereby said delay will be indicative of the range of the object producing said selected echo signal.

3. A precision range finding system, comprising a radio pulse transmitter, a receiver, and a visual indicator connected thereto for recording the time relation between the transmitted pulses and echo signals resulting therefrom, a pulse generator comprising a pair of triode vacuum tubes having their anodes and grids interconnected in such a manner as to form a multivibrator circuit, means for rendering one of said tubes non-conducting simultaneously with the keying of said pulse transmitter to thereby produce a pulse in the output of the other of said tubes, means including a differentiating circuit connected to the output of said other of said tubes in said multivibrator circuit to convert said output pulse from said other of said tubes into a pair of time spaced pulses, one of said pair of time spaced pulses being displaced from the other by an amount equal in time to the duration of the output pulse from said other of said tubes, and an adjustable biasing means connected to one of said tubes in said multivibrator circuit for controlling the duration of the output pulse from said other of said tubes whereby said one pulse of said time spaced pair may be shifted into time coincidence with a selected echo signal, and whereby the setting of said biasing means will be indicative of the range of the object producing said selected echo signal.

4. A precision range finding system, comprising a radio pulse transmitter, a receiver, and a visual indicator connected thereto for recording the time relation between the transmitted pulses and echo signals resulting therefrom, a pulse generator comprising a pair of vacuum tubes interconnected in such a manner as to form a multivibrator circuit, means for rendering one of said tubes non-conducting simultaneously with the keying of said pulse transmitter to thereby produce a pulse in the output of the other of said tubes, means including a differentiating circuit and a clipping amplifier connected to the output of said other of said tubes in said multivibrator circuit to convert said output pulse from said other of said tubes into a pair of time spaced, sense opposed pulses, one of said pair of time spaced pulses being displaced from the other by an amount equal in time to the duration of the output pulse from said other of said tubes, said clipping amplifier operating to suppress said other pulse of said time spaced pair, and an adjustable biasing means coupled to said one of said tubes for controlling the duration of the output pulse from said other of said tubes whereby said one pulse of said pair may be shifted into time coincidence with a selected echo signal, and whereby the setting of said adjustable biasing means will be indicative of the range of the object producing said selected echo signal.

5. A precision range finding system, comprising a radio pulse transmitter, a receiver, and a visual indicator connected thereto for recording the time relation between the transmitted pulses and echo signals resulting therefrom, a pulse generator comprising a pair of triode vacuum tubes having their anodes and grids interconnected in such a manner as to form a multivibrator circuit, means for rendering one of said tubes non-conducting simultaneously with the keying of said pulse transmitter to thereby produce a pulse in the output of the other of said tubes, means including a differentiating circuit and a clipping amplifier connected to the output of said other of said tubes in said multivibrator circuit to convert said output pulse from said other of said tubes into a pair of time spaced, sense opposed pulses, one of said pair of time spaced pulses being displaced from the other by an amount equal in time to the duration of the output pulse from said other of said tubes, said clipping amplifier operating to suppress said other pulse of said time spaced pair, and an adjustable biasing means coupled to said one of said tubes for controlling the duration of the output pulse from said other of said tubes whereby said one pulse of said pair may be shifted into time coincidence with a selected echo signal, and whereby the setting of said adjustable biasing means will be indicative of the range of the object producing said selected echo signal.

6. A precision range finding system, comprising a radio pulse transmitter, a receiver, and a visual indicator connected thereto for recording the time relation between the transmitted pulses and echo signals resulting therefrom, a pulse generator comprising a pair of triode vacuum tubes having their anodes and grids interconnected in such a manner as to form a multivibrator circuit, means for rendering one of said tubes non-conducting simultaneously with the keying of said pulse transmitter to thereby produce a pulse in the output of the other of said tubes, means including a differentiating circuit and a clipping amplifier connected to the output of said other of said tubes in said multivibrator circuit to convert said output pulse from said other of said tubes into a pair of time spaced, sense opposed pulses, one of said pair of time spaced pulses being displaced from the other by an amount equal in time to the duration of the output pulse from said other of said tubes, said clipping amplifier operating to suppress said other pulse of said time spaced pair, and an adjustable biasing means coupled to said one of said tubes for controlling the duration of the output pulse from said other of said tubes whereby said one pulse of said pair may be shifted into time coincidence with a selected echo signal, and whereby the setting of said adjustable biasing means will be indicative of the range of the object producing said selected echo signal, and means coupled to said clipping amplifier for controlling the width of the output pulse therefrom.

ALLEN H. SCHOOLEY.

REFERENCES CITED

The following references are of record in the file of this patent:

UNITED STATES PATENTS

| Number | Name | Date |
|---|---|---|
| 2,061,734 | Kell | Nov. 24, 1936 |
| 2,208,422 | Hugon | July 16, 1940 |
| 2,402,916 | Schroeder | June 25, 1946 |
| 2,407,898 | Norgaard | Sept. 17, 1946 |
| 2,414,323 | Moe | Jan. 14, 1947 |
| 2,416,088 | Deerhake | Feb. 18, 1947 |
| 2,416,089 | Jones | Feb. 18, 1947 |
| 2,426,216 | Hight | Aug. 26, 1947 |

FOREIGN PATENTS

| Number | Country | Date |
|---|---|---|
| 113,233 | Australia | June 2, 1941 |